(12) United States Patent
Hsu et al.

(10) Patent No.: US 8,654,729 B2
(45) Date of Patent: Feb. 18, 2014

(54) BASE STATION AND UPLINK TRANSMISSION METHOD THEREOF

(75) Inventors: Heng-Iang Hsu, Taipei (TW);
Shiann-Tsong Sheu, Taipei (TW);
Chun-Hsiang Chiu, Keelung (TW);
Hsien-Hao Lai, Kaohsiung (TW);
Shu-Hua Kao, New Taipei (TW);
Yi-Ting Lin, New Taipei (TW)

(73) Assignee: Institute for Information Industry, Taipei (TW)

(*) Notice: Subject to any disclaimer, the term of this patent is extended or adjusted under 35 U.S.C. 154(b) by 306 days.

(21) Appl. No.: 13/311,942

(22) Filed: Dec. 6, 2011

(65) Prior Publication Data

US 2012/0281681 A1    Nov. 8, 2012

Related U.S. Application Data

(60) Provisional application No. 61/481,745, filed on May 3, 2011.

(51) Int. Cl.
*H04W 4/00*    (2009.01)

(52) U.S. Cl.
USPC .......................... 370/329; 370/338; 370/400

(58) Field of Classification Search
CPC ... H04L 63/0428; H04L 47/34; H04W 12/02; H04W 24/00; H04W 74/06
See application file for complete search history.

(56) References Cited

U.S. PATENT DOCUMENTS

| | | | |
|---|---|---|---|
| 2010/0067412 A1* | 3/2010 | Kitazoe et al. | 370/294 |
| 2011/0032889 A1* | 2/2011 | Lee et al. | 370/329 |
| 2011/0207485 A1* | 8/2011 | Dimou et al. | 455/507 |

\* cited by examiner

*Primary Examiner* — Jung Park
(74) *Attorney, Agent, or Firm* — Skaar Ulbrich Macari, P.A.

(57) ABSTRACT

A base station and an uplink transmission method thereof are provided. The base station receives a plurality of first uplink transmission requests of a plurality of first wireless devices of a first group and a plurality of second uplink transmission requests of a plurality of second wireless devices of a second group in a first time interval, and approves one of the second uplink transmission requests. The base station receives second uplink transmission data of the second wireless device corresponding to the approved second uplink transmission request in a second time interval behind the first time interval. The base station receives the second uplink transmission requests of the second wireless devices corresponding to the unapproved second uplink transmission requests in a third time interval behind the second time interval.

16 Claims, 5 Drawing Sheets

BASE STATION AND UPLINK TRANSMISSION METHOD THEREOF

PRIORITY

This application claims priority to U.S. Patent Provisional Application No. 61/481,745 filed on May 3, 2011, which is hereby incorporated by reference in its entirety.

FIELD

The present invention relates to a base station and an uplink transmission method thereof; and more particularly, the present invention relates to a base station that schedules uplink transmissions dynamically and an uplink transmission method thereof.

BACKGROUND

With advancement of science and technologies, various wireless communication network technologies have been developed in succession to satisfy different demands of the modern people for wireless communications. However, because different wireless network technologies may correspond to different frameworks and specifications, how to make a balance or compromise between new and old wireless communication network technologies becomes a serious problem. Therefore, a desirable way is to make improvement on wireless communication network technologies without violating the original wireless communication network technologies.

People can see in recent years the advent of Machine to Machine (M2M) wireless communication networks, which allows different devices to communicate with and exchange data with each other without the need of (or with the need of only a limited amount of) human-machine interactions. In order to satisfy the modern people's desires for M2M wireless communication networks, nearly all wireless communication network service providers come to introduce the concept of M2M so as to gain extensive benefits from the innovative service concept.

Wireless communication network systems established according to the conventional wireless communication network system frameworks are all designed on the basis of human to human (H2H) behaviors and demands. Besides, when wireless devices that have not been synchronized are to upload data to a base station, the wireless devices must contend with each other for the uplink transmission bandwidth through a random accessing mechanism so as to gain an opportunity of uplink transmission. However, because of the large number of M2M wireless devices and because M2M wireless devices are often deployed concentratively, many technical problems have to be tackled in order to introduce the concept of M2M into the existing wireless communication network systems.

For example, under the framework of the existing Long Term Evolution (LTE) system of the $3^{rd}$ Generation Partnership Project (3GPP), a user equipment (UE) must perform at least the following steps when it desires to upload data to an evolution node base station (eNodeB): (p1) the UE selects one of sixty four preambles for transmitting an uplink transmission request to the eNodeB; (p2) the eNodeB transmits a relevant message to the UE in response to the preamble; (p3) the UE transmits an uplink bandwidth request to the eNodeB in response to the relevant message; and (p4) the eNodeB makes a schedule to allow the UE to upload data.

Under the framework of the LTE system of 3GPP, the sixty four preambles are shared by the individual UEs, and once one of the preambles is chosen by a number of UEs, a collision will occur in the step (p3). When such a collision occurs, the UEs must wait for a period of time before they can transmit an uplink transmission request to the eNodeB again. Unfortunately, when M2M wireless devices are integrated into an existing H2H wireless communication network, the large number of M2M wireless devices will share the sixty four preambles with the existing H2H wireless devices. Consequently, collisions tend to occur for uplink data transmissions of either the M2M wireless devices or the H2H wireless devices in the integrated wireless communication network.

Accordingly, an urgent need exists in the art to effectively overcome the problem that collisions tend to occur for uplink data transmissions of M2M wireless devices and H2H wireless devices without destroying the existing wireless communication network framework.

SUMMARY

An objective of the present invention is to provide a base station and an uplink transmission method thereof. In detail, the base station and the uplink transmission method thereof according to the present invention includes dynamically scheduling M2M wireless devices of a same group to transmit uplink transmission requests within a specific time interval so that the M2M wireless devices transmit uplink transmission requests within time intervals spaced apart from a time interval in which H2H wireless devices of a different group transmit uplink transmission requests. Thereby, the problem that collisions tend to occur for uplink data transmissions of the M2M wireless devices and the H2H wireless devices can be effectively overcome without destroying the existing wireless communication network frameworks.

To achieve the aforesaid objective, certain embodiments of the present invention provide a base station. The base station comprises a wireless transceiver and a processor electrically connected to the wireless transceiver. The wireless transceiver is configured to communicate with a plurality of first wireless devices of a first group and a plurality of second wireless devices of a second group. The processor is configured to execute the following operations:

(a) defining a first time interval and instructing the wireless transceiver to receive a plurality of first uplink transmission requests of the first wireless devices and a plurality of second uplink transmission requests of the second wireless devices within the first time interval;

(b) approving one of the second uplink transmission requests within the first time interval;

(c) defining a second time interval behind the first time interval, and instructing the wireless transceiver to receive second uplink transmission data of the second wireless device corresponding to the approved second uplink transmission request within the second time interval; and (d) defining a third time interval behind the second time interval, and instructing the wireless transceiver to receive the uplink transmission requests of the second wireless devices corresponding to the unapproved second uplink transmission requests within the third time interval.

To achieve the aforesaid objective, certain embodiments of the present invention further provide an uplink transmission method for a base station. The base station comprises a wireless transceiver and a processor electrically connected to the wireless transceiver. The uplink transmission method comprises the following steps of:

(a) communicating with a plurality of first wireless devices of a first group and a plurality of second wireless devices of a second group by the wireless transceiver;

(b) defining a first time interval by the processor, and instructing the wireless transceiver to receive a plurality of first uplink transmission requests of the first wireless devices and a plurality of second uplink transmission requests of the second wireless devices within the first time interval by the processor;

(c) approving one of the second uplink transmission requests within the first time interval by the processor;

(d) defining a second time interval behind the first time interval by the processor, and instructing the wireless transceiver to receive second uplink transmission data of the second wireless device corresponding to the approved second uplink transmission request within the second time interval by the processor; and (e) defining a third time interval behind the second time interval by the processor, and instructing the wireless transceiver to receive the uplink transmission requests of the second wireless devices corresponding to the unapproved second uplink transmission requests within the third time interval by the processor.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

In the following descriptions, the present invention will be explained with reference to example embodiments thereof. However, these example embodiments are not intended to limit the present invention to any specific example, embodiment, environment, applications or particular implementations described in these example embodiments. Therefore, descriptions of these example embodiments are only for purpose of illustration rather than to limit the present invention, and the scope of the present invention shall be governed by the claims. It should be appreciated that, in the following example embodiments and the attached drawings, elements unrelated to the present invention are omitted from depiction; and dimensional relationships among individual elements in the attached drawings are illustrated only for ease of understanding, but not to limit the actual scale.

Figure 1:
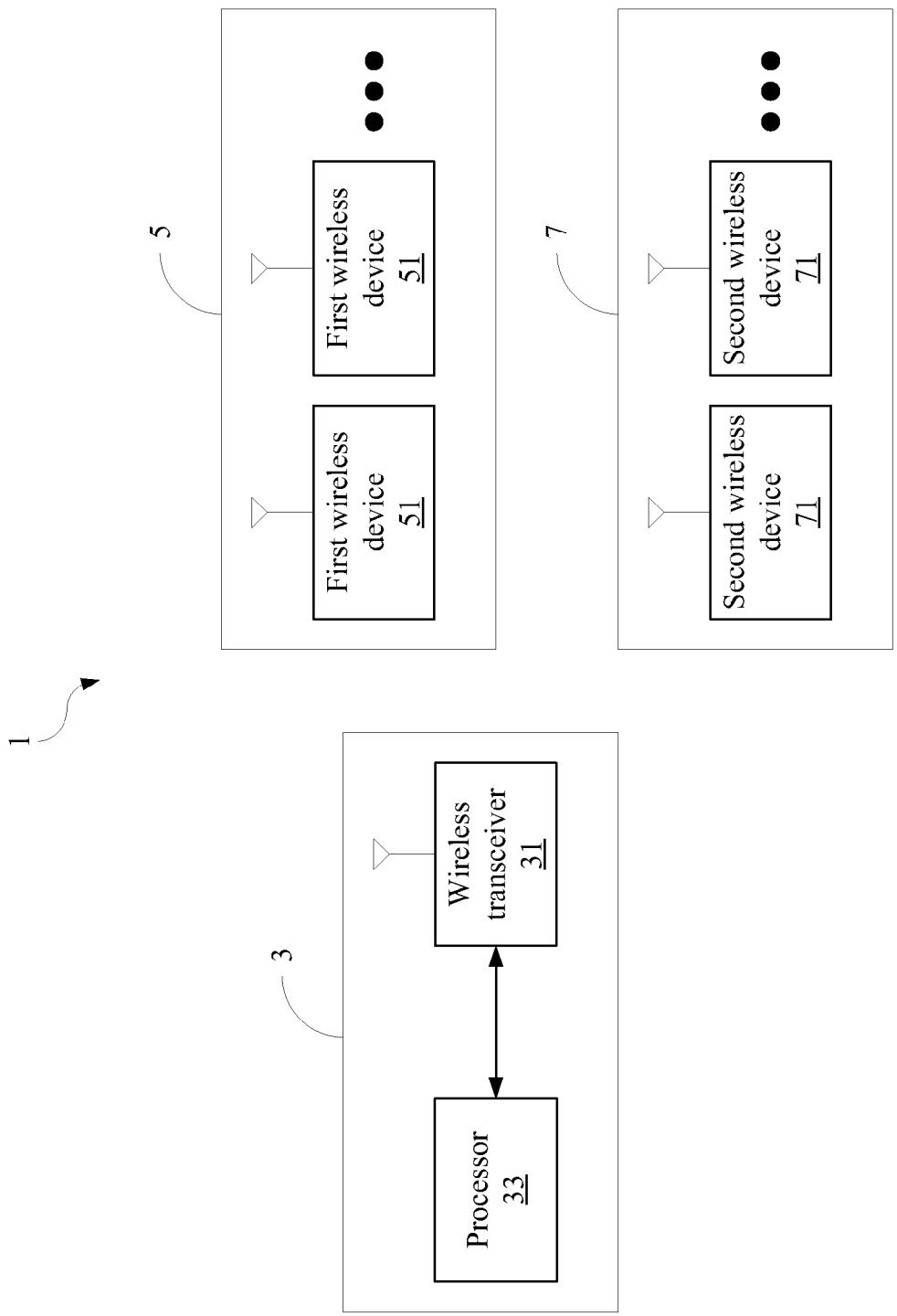
FIG. 1 is a schematic view illustrating connections of a wireless communication network system 1 according to a first embodiment of the present invention.

A first embodiment of the present invention is a wireless communication network system 1, which will be described with reference to FIGS. 1~3 together. FIG. 1 is a schematic view illustrating connections of the wireless communication network system 1 according to the present invention, FIG. 2 is a schematic view illustrating a timing sequence of the wireless communication network system 1 according to the present invention, and FIG. 3 is an operational flowchart diagram of the wireless communication network system 1 according to the present invention.

As shown in FIG. 1, the wireless communication network system 1 comprises a base station 3, a first group 5 and a second group 7. The first group 5 comprises a plurality of first wireless devices 51, and the second group 7 comprises a plurality of second wireless devices 71. The base station 3 at least comprises a wireless transceiver 31 and a processor 33 electrically connected to the wireless transceiver 31. The wireless transceiver 31 is configured to communicate with the first wireless devices 51 of the first group 5 and the second wireless devices 71 of the second group 7. For ease of understanding, the first group 5 is a Human to Human (H2H) wireless device group and the second group 7 is a Machine to Machine (M2M) wireless device group in this embodiment. However, examples in which the first group 5 is an M2M wireless device group and the second group 7 is an H2H wireless device group also fall within the scope of the present invention.

How the base station 3 dynamically schedules M2M wireless devices of a same group to transmit uplink transmission requests within a specific time interval will be further described. For ease of understanding, it is assumed in FIG. 2 that the second group 7 comprises three second wireless devices 71 in total, which are denoted by second wireless devices 71a, 71b and 71c respectively. However, the number of second wireless devices 71 comprised in the second group 7 is not limited to what shown in FIG. 2.

Figure 2:
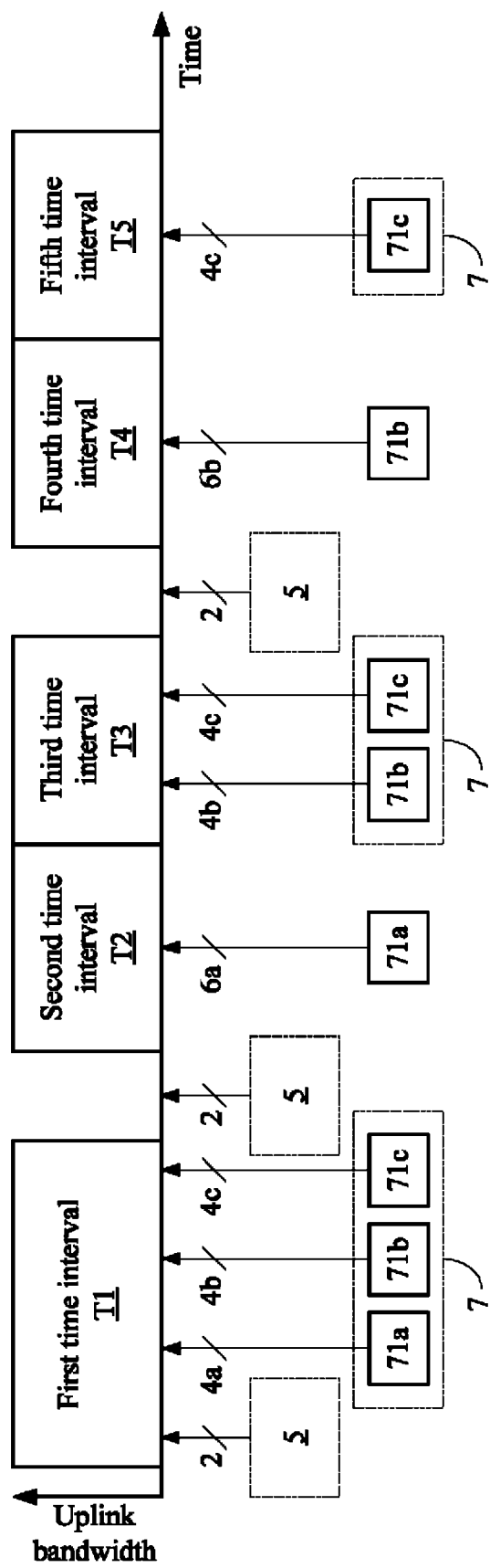
FIG. 2 is a schematic view illustrating a timing sequence of the wireless communication network system 1 according to the present invention.
Figure 3:
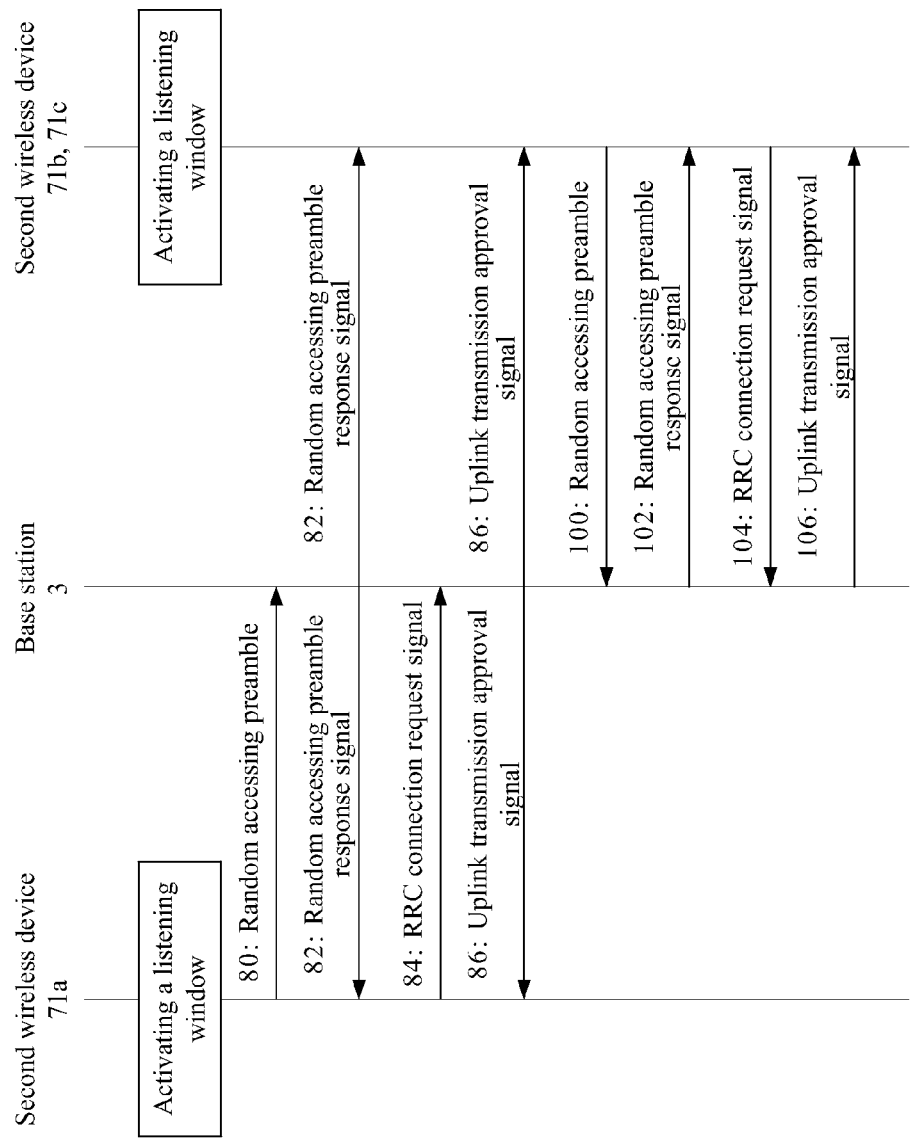
FIG. 3 is an operational flowchart of the wireless communication network system 1 according to the present invention.

As shown in FIG. 2, the processor 33 of the base station 3 firstly defines a first time interval T1, and instructs the wireless transceiver 31 to receive a plurality of first uplink transmission requests 2 of the first wireless devices 51 of the first group 5, a second uplink transmission request 4a of the wireless device 71a of the second group 7, a second uplink transmission request 4b of the second wireless device 71b of the second group 7 and a second uplink transmission request 4c of the second wireless device 71c of the second group 7 simultaneously within the first time interval T1. Correspondingly, the first wireless devices 51 of the first group 5 and the second wireless devices 71a, 71b and 71c of the second group 7 will contend with each other for an opportunity of uplink transmission within the first time interval T1.

If none of the second uplink transmission request 4a of the second wireless device 71a, the second uplink transmission request 4b of the second wireless device 71b and the second uplink transmission request 4c of the second wireless device 71c is approved by the processor 33 of the base station 3 within the first time interval T1, the second wireless devices 71a, 71b and 71c of the second group 7 must wait for a period of time until the processor 33 of the base station 3 defines a next first time interval T1; and then the second wireless devices 71a, 71b and 71c of the second group 7 will contend with the first wireless devices 51 of the first group 5 for an opportunity of uplink transmission within said next first time interval. However, if one of the second uplink transmission request 4a of the second wireless device 71a, the second uplink transmission request 4b of the second wireless device 71b and the second uplink transmission request 4c of the second wireless device 71c is approved by the processor 33 of the base station 3 within the first time interval T1, other second wireless devices 71 that are not approved will be allowed to contend for an opportunity of uplink transmission within a specific time interval which is spaced apart from the time interval in which the first wireless devices 51 of the first group 5 contend for uplink transmission.

As shown in FIG. 2, if the second uplink transmission request 4a of the second wireless device 71a of the second group 7 is approved by the processor 33 of the base station 3 within the first time interval T1, then the processor 33 of the base station 3 defines a second time interval T2 behind the first time interval T1 and instructs the wireless transceiver 31 to receive second uplink transmission data 6a of the second wireless device 71a corresponding to the approved second uplink transmission request 4a. Meanwhile, the processor 33 of the base station 3 further defines a third time interval T3 behind the second time interval T2, and instructs the wireless transceiver 31 to receive only a second uplink transmission request 4b of the second wireless device 71b corresponding to the unapproved second uplink transmission request 4b and a second uplink transmission request 4c of the second wireless device 71c corresponding to the unapproved second uplink transmission request 4c within the third time interval T3.

Because the wireless transceiver 31 of the base station 3 is instructed by the processor 33 to only receive the uplink transmission request 4b of the second wireless device 71b and the second uplink transmission request 4c of the second wireless device 71c within the time interval T3, the time interval in which the uplink transmission request 4b of the second wireless device 71b and the second uplink transmission request 4c of the second wireless device 71c are received is effectively spaced apart from the time interval in which the first wireless devices 51 of the first group 5 transmit uplink transmission requests. In other words, the time interval in which the second wireless device 71b transmits the uplink transmission request 4b and the second wireless device 71c transmits the uplink transmission request 4c is different from the time interval in which the first wireless devices 51 of the first group 5 transmit uplink transmission requests, so collisions of uplink data transmissions between different groups can be avoided. It shall be appreciated that, the processor 33 of the base station 3 can define properties including a time duration of the third time interval T3 according to the first uplink transmission data 6a received by the wireless transceiver 31 within the second time interval T2.

Next, as shown in FIG. 2, if the processor 33 of the base station 3 approves the unapproved second uplink transmission request 4b within the third time interval T3, then the processor 33 of the base station 3 defines a fourth time interval T4 behind the third time interval T3 and instructs the wireless transceiver 31 to receive within the fourth time interval T4 second uplink transmission data 6b of the second wireless device 71b corresponding to the second uplink transmission request 4b approved within the third time interval T3. Meanwhile, the processor 33 of the base station 3 further defines a fifth time interval T5 behind the fourth time interval T4 and instructs the wireless transceiver 31 to receive, within the fifth time interval T5, only an uplink transmission request 4c of the second wireless device 71c corresponding to the second uplink transmission request 4c which is unapproved within the third time interval T3. It shall be appreciated that, the processor 33 of the base station 3 can define properties including a time duration of the fifth time interval T5 according to the second uplink transmission data 6b received by the wireless transceiver 31 within the fourth time interval T4.

It can be known from FIG. 2 that, time intervals in which the second wireless devices 71 of the second group 7 transmit uplink transmission requests can be continuously spaced apart from the time intervals in which the first wireless devices 51 of the first group 5 transmit uplink transmission requests as long as the uplink transmission requests transmitted by the second wireless devices 71 of the second group 7 are approved by the processor 33 of the base station 3 continuously. However, once uplink transmission requests transmitted by the second wireless devices 71 of the second group 7 are interrupted, the second wireless devices 71 of the second group 7 will transmit uplink transmission requests simultaneously with the first wireless devices 51 of the first group 5 within the first time interval T1 again. In other words, the base station 3 of the present invention can dynamically schedule wireless devices of a same group (i.e., the second wireless devices of the second group) to transmit uplink transmission requests within a specific time interval in response to occurrence of events so that the uplink transmission requests are transmitted within a time interval spaced apart from a time interval in which wireless devices of a different group (i.e., the first wireless devices of the first group) transmit uplink transmission requests.

Hereinbelow, operational relationships between the base station 3 and the second wireless devices 71a~71c of the second group 7 in the present invention will be further described with reference to FIG. 3. It shall be appreciated that, the operation relationships shown in FIG. 3 represent a basic framework of uplink transmissions, so the operational relationships between the base station 3 and the second wireless devices 71a~71c of the second group 7 can be readily applied to any existing wireless communication network systems by those of ordinary skill in the art according to the framework shown in FIG. 3.

As shown in FIG. 3, before transmitting the uplink transmission requests 4a~4c, the second wireless devices 71a~71c of the second group 7 firstly activate a listening window or a listening time interval respectively to observe a time interval in which the wireless transceiver 31 of the base station 3 can receive the uplink transmission requests 4a~4c. Furthermore, if the second wireless device 71a of the second group 7 detects within the listening window that no specific time interval (e.g., the third time interval T3 or the fifth time interval T5 described above) is currently available for the wireless transceiver 31 of the base station 3 to receive the uplink transmission request 4a, then the second wireless device 71a of the second group 7 will transmit the uplink transmission request 4a within the first time interval T1 defined by the processor 33 of the base station 3 and contend with the first wireless devices 51 of the first group 5 for an opportunity of uplink transmission.

Specifically, the second wireless device 71a of the second group 7 firstly transmits a random accessing preamble 80 to the wireless transceiver 31 of the base station 3 within the first time interval T1, and then the wireless transceiver 31 of the base station 3 transmits a random accessing preamble response signal 82 to the second wireless device 71a of the second group 7 within the first time interval T1. If the second wireless devices 71b~71c of the second group 7 have activated a listening window respectively at this time, then the second wireless devices 71b~71c of the second group 7 can obtain the random accessing preamble response signal 82 transmitted by the wireless transceiver 31 of the base station 3 simultaneously.

Next, the second wireless device 71a of the second group 7 transmits a radio resource control (RRC) connection request signal 84 to the wireless transceiver 31 of the base station 3 within the first time interval T1. The wireless transceiver 31 of the base station 3 transmits an uplink transmission approval signal 86 within the first time interval T1 in response to the RRC connection request signal 84. The uplink transmission approval signal 86 informs the second wireless device 71a of the second group 7 that it can transmit the uplink transmission data 6a to the wireless transceiver 31 of the base station 3 within the second time interval T2. Besides, the uplink transmission approval signal 86 also carries a message that the processor 33 of the base station 3 has defined a third time interval T3; and accordingly, the second wireless devices 71b~71c of the second group 7 can learn within respective listening windows that the wireless transceiver 31 of the base station 3 has transmitted the uplink transmission approval signal 86 to the second wireless device 71a and further know the existence of the third time interval T3.

As the existence of the third time interval T3 has been known by the second wireless devices 71b~71c of the second group 7, the second wireless devices 71b~71c of the second group 7 will transmit a random accessing preamble 100 to the wireless transceiver 31 of the base station 3 respectively within the third time interval T3. The wireless transceiver 31 of the base station 3 will then transmits a random accessing preamble response signal 102 to the second wireless devices 71b~71c of the second group 7 respectively. Afterwards, the second wireless devices 71b~71c of the second group 7 each transmit an RRC connection request signal 104 to the wireless transceiver 31 of the base station 3 within the third time interval T3 to request for an opportunity of uplink transmission within the third time interval T3. Next, within the third time interval T3, the wireless transceiver 31 of the base station 3 transmits an uplink transmission approval signal 106 to the second wireless device 71b or the second wireless device 71c that has been approved by the processor 33 of the base station 3.

Finally, the second wireless device 71 which has received the uplink transmission approval signal 106 will transmit uplink transmission data within the time interval specified by the base station 3, while the second wireless devices 71 which have not received an uplink transmission approval signal 106 will wait to contend with other wireless devices 71 of the second group 7 for an opportunity of uplink transmission within a next specific time interval.

It shall be appreciated that, the base station and the uplink transmission method thereof according to the present invention are applied to any existing wireless communication network system without destroying the original wireless communication network framework, which can be readily appreciated by those of ordinary skill in the art upon reviewing the aforesaid embodiment and the attached drawings.

As an example, if the wireless communication network system 1 of this embodiment is an LTE wireless communication network of 3GPP, then the base station 3 as well as the first wireless devices 51 of the first group 5 and the second wireless devices 71 of the second group 7 in this embodiment shall comply with the LTE standard of 3GPP. Under this system framework, the second wireless devices 71 of the second group 7 may correspond to a plurality of Machine to Machine UEs (M2M-UEs) and the base station 3 may correspond to an eNodeB. Each of the M2M-UEs firstly activates a listening window before transmitting an uplink transmission request. Within the listening window, each of the M2M-UEs firstly observes all messages transmitted by the eNodeB, records a related Cell-Radio Network Temporary Identifier (C-RNTI) and observes whether any other M2M-UE is transmitting uplink transmission data to the eNodeB according to the C-RNTI. If there is any M2M-UE that is transmitting uplink transmission data to the eNodeB, then the M2M-UEs know that a specific time interval has been defined by the eNodeB and they can contend for an opportunity of uplink transmission within the specific time interval; otherwise, if there is no M2M-UE that is transmitting uplink transmission data to the eNodeB, then the M2M-UEs will contend with Human to Human UEs (H2H-UEs) for an opportunity of uplink transmission.

As another example, if the wireless communication network system 1 of this embodiment complies with the WiMAX standard, then the base station 3 as well as the first wireless devices 51 of the first group 5 and the second wireless devices 71 of the second group 7 in this embodiment shall also comply with the WiMAX standard. Under this system framework, one of the second wireless devices 71 of the second group 7 may correspond to a pre-selected M2M group leader, while the other second wireless devices 71 may correspond to a plurality of M2M group members. The M2M group leader will access the network within a common resource range; and the M2M group members will monitor a message replied to the M2M group leader by the base station to learn a specific resource range. Then, the M2M group members will access the network within the specific resource range to avoid contention with wireless devices of the H2H group within the common resource range.

A second embodiment of the present invention is an uplink transmission method for a base station. The base station at least comprises a wireless transceiver and a processor electrically connected to the wireless transceiver. Hereinafter, this embodiment will be described with reference to FIGS. 4A and 4B, which are flowchart diagrams of this embodiment.

Figure 4A:
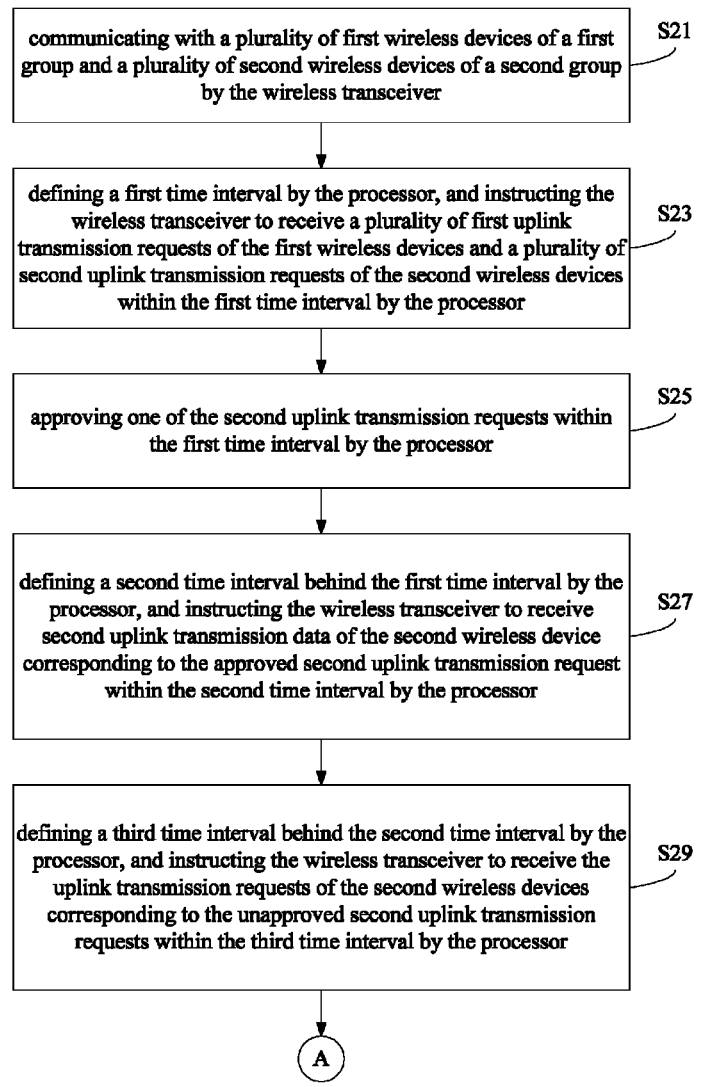
FIGS. 4A and 4B disclose a flowchart of a second embodiment according to the present invention.

As shown in FIG. 4A, step S21 is executed to communicate with a plurality of first wireless devices of a first group and a plurality of second wireless devices of a second group by the wireless transceiver. Then, step S23 is executed to define a first time interval by the processor, and to instruct the wireless transceiver to receive a plurality of first uplink transmission requests of the first wireless devices and a plurality of second uplink transmission requests of the second wireless devices within the first time interval by the processor. Step S25 is executed to approve one of the second uplink transmission requests within the first time interval by the processor. Next, step S27 is executed to define a second time interval behind the first time interval by the processor, and to instruct the wireless transceiver to receive second uplink transmission data of the second wireless device corresponding to the approved second uplink transmission request within the second time interval by the processor. Step S29 is executed to define a third time interval behind the second time interval by the processor, and to instruct the wireless transceiver to receive the uplink transmission requests of the second wireless devices corresponding to the unapproved second uplink transmission requests within the third time interval by the processor.

Figure 4B:
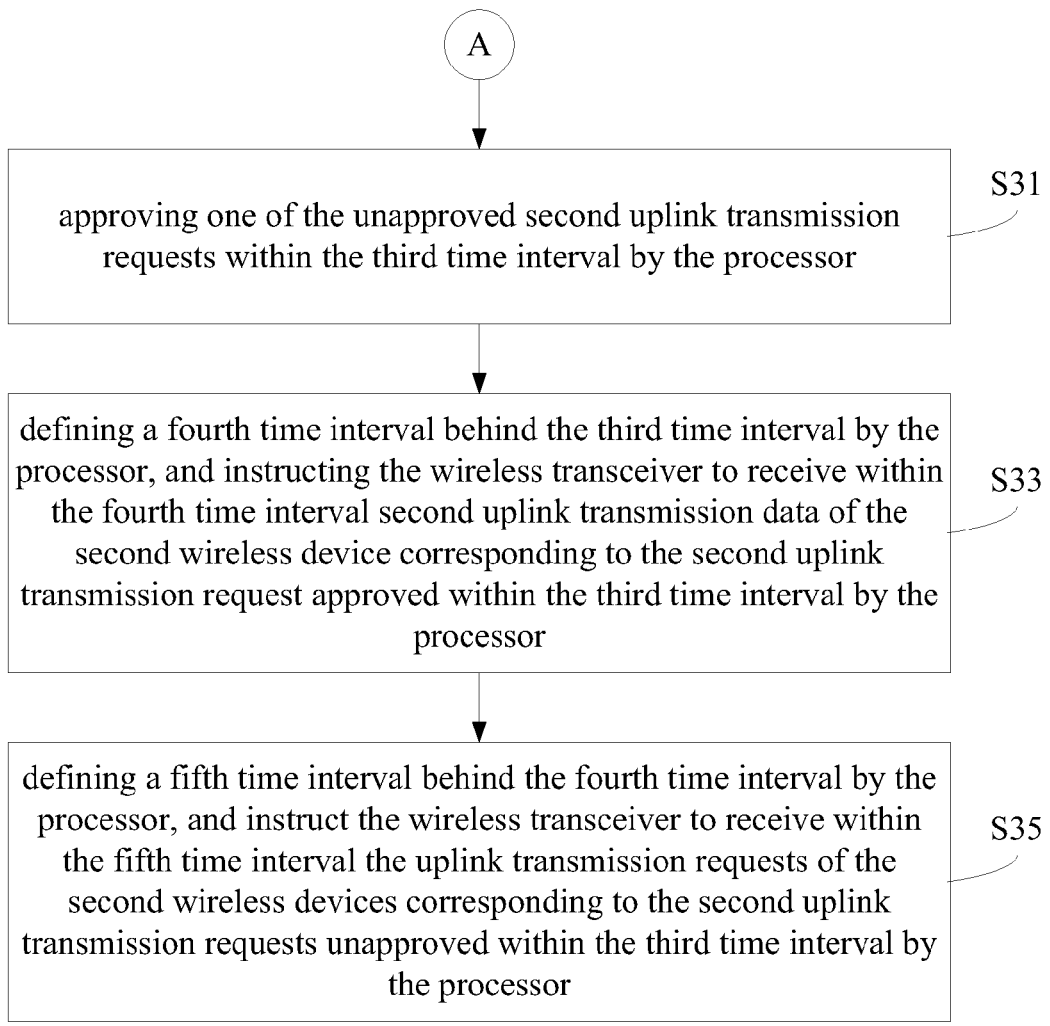

As shown in FIG. 4B, step S31 is executed to approve one of the unapproved second uplink transmission requests within the third time interval by the processor. Then, step S33 is executed to define a fourth time interval behind the third time interval by the processor, and to instruct the wireless transceiver to receive within the fourth time interval second uplink transmission data of the second wireless device corresponding to the second uplink transmission request approved within the third time interval by the processor. Finally, step S35 is executed to define a fifth time interval behind the fourth time interval by the processor, and to instruct the wireless transceiver to receive within the fifth time interval the uplink transmission requests of the second wireless devices corresponding to the second uplink transmission requests unapproved within the third time interval by the processor.

It shall be appreciated that, in addition to the aforesaid steps, the second embodiment can also execute all the operations and functions set forth in the first embodiment. How the second embodiment executes these operations and functions will be readily appreciated by those of ordinary skill in the art based on the explanation of the first embodiment, and thus will not be further described herein.

According to the above descriptions, the base station and the uplink transmission method thereof of the present invention dynamically schedule M2M wireless devices of a same group to transmit uplink transmission requests within a specific time interval so that the M2M wireless devices transmit uplink transmission requests within time intervals spaced apart from a time interval in which H2H wireless devices of a different group transmit uplink transmission requests. Thereby, the problem that collisions tend to occur for uplink data transmissions of the M2M wireless devices and the H2H wireless devices can be effectively overcome without destroying the existing wireless communication network frameworks.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A base station, comprising:
   a wireless transceiver, being configured to communicate with a plurality of first wireless devices of a first group and a plurality of second wireless devices of a second group; and
   a processor electrically connected to the wireless transceiver, being configured to execute the following operations:
      defining a first time interval and instructing the wireless transceiver to receive a plurality of first uplink transmission requests of the first wireless devices and a plurality of second uplink transmission requests of the second wireless devices within the first time interval,
      approving one of the second uplink transmission requests within the first time interval,
      defining a second time interval behind the first time interval, and instructing the wireless transceiver to receive second uplink transmission data of the second wireless device corresponding to the approved second uplink transmission request within the second time interval, and
      defining a third time interval behind the second time interval, and instructing the wireless transceiver to receive the uplink transmission requests of the second wireless devices corresponding to the unapproved second uplink transmission requests within the third time interval.

2. The base station as claimed in claim 1, wherein the processor is further configured to execute the following operations:
   approving one of the unapproved second uplink transmission requests within the third time interval,
   defining a fourth time interval behind the third time interval, and instructing the wireless transceiver to receive within the fourth time interval second uplink transmission data of the second wireless device corresponding to the second uplink transmission request approved within the third time interval, and
   defining a fifth time interval behind the fourth time interval, and instructing the wireless transceiver to receive within the fifth time interval the uplink transmission requests of the second wireless devices corresponding to the second uplink transmission requests unapproved within the third time interval.

3. The base station as claimed in claim 2, wherein the first group is an H2H wireless device group, and the second group is an M2M wireless device group.

4. The base station as claimed in claim 3, wherein the processor defines the third time interval according to the second uplink transmission data received by the wireless transceiver within the second time interval.

5. The base station as claimed in claim 4, wherein the base station further complies with one of the LTE standard of 3GPP and the WiMAX standard.

6. The base station as claimed in claim 1, wherein the first group is a Human to Human (H2H) wireless device group, and the second group is a Machine to Machine (M2M) wireless device group.

7. The base station as claimed in claim 6, wherein the processor defines the third time interval according to the second uplink transmission data received by the wireless transceiver within the second time interval.

8. The base station as claimed in claim 7, wherein the base station complies with one of the Long Term Evolution (LTE) standard of the $3^{rd}$ Generation Partnership Project (3GPP) and the Worldwide Interoperability for Microwave Access (WiMAX) standard.

9. An uplink transmission method for a base station, the base station comprising a wireless transceiver and a processor electrically connected to the wireless transceiver, the uplink transmission method comprising the steps of:
   (a) communicating with a plurality of first wireless devices of a first group and a plurality of second wireless devices of a second group by the wireless transceiver;
   (b) defining a first time interval by the processor, and instructing the wireless transceiver to receive a plurality of first uplink transmission requests of the first wireless devices and a plurality of second uplink transmission requests of the second wireless devices within the first time interval by the processor;
   (c) approving one of the second uplink transmission requests within the first time interval by the processor;
   (d) defining a second time interval behind the first time interval by the processor, and instructing the wireless transceiver to receive second uplink transmission data of the second wireless device corresponding to the approved second uplink transmission request within the second time interval by the processor; and
   (e) defining a third time interval behind the second time interval by the processor, and instructing the wireless transceiver to receive the uplink transmission requests of the second wireless devices corresponding to the unapproved second uplink transmission requests within the third time interval by the processor.

10. The uplink transmission method as claimed in claim 9, further comprising the steps of
   (f) approving one of the unapproved second uplink transmission requests within the third time interval by the processor;

(g) defining a fourth time interval behind the third time interval by the processor, and instructing the wireless transceiver to receive within the fourth time interval second uplink transmission data of the second wireless device corresponding to the second uplink transmission request approved within the third time interval by the processor; and (h) defining a fifth time interval behind the fourth time interval by the processor, and instruct the wireless transceiver to receive within the fifth time interval the uplink transmission requests of the second wireless devices corresponding to the second uplink transmission requests unapproved within the third time interval by the processor.

11. The uplink transmission method as claimed in claim 10, wherein the first group is an H2H wireless device group, and the second group is an M2M wireless device group.

12. The uplink transmission method as claimed in claim 11, wherein the processor defines the third time interval according to the second uplink transmission data received by the wireless transceiver within the second time interval.

13. The uplink transmission method as claimed in claim 12, wherein the base station complies with one of the LTE standard of 3GPP and the WiMAX standard.

14. The uplink transmission method as claimed in claim 9, wherein the first group is an H2H wireless device group, and the second group is an M2M wireless device group.

15. The uplink transmission method as claimed in claim 14, wherein the processor defines the third time interval according to the second uplink transmission data received by the wireless transceiver within the second time interval.

16. The uplink transmission method as claimed in claim 15, wherein the base station complies with one of the LTE standard of 3GPP and the WiMAX standard.

* * * * *